United States Patent [19]

Murgio et al.

[11] 3,868,480

[45] Feb. 25, 1975

[54] EVENT MONITORING TRANSCEIVER

[75] Inventors: Joseph M. Murgio, Clifton; Lawrence J. Pincus, Englishtown; Guenter J. Boehm, Cherry Hill, all of N.J.

[73] Assignee: Telesciences, Inc., Moorestown, N.J.

[22] Filed: Jan. 24, 1974

[21] Appl. No.: 436,082

[52] U.S. Cl. .............................................. 179/8 A

[51] Int. Cl. ......................................... H04m 15/22

[58] Field of Search .................. 179/8 A, 15 A, 2 A; 178/50; 235/150.1; 340/31 A; 346/14 MR

[56] References Cited

UNITED STATES PATENTS 3,761,618 9/1973 Alston ................................ 179/8 A

*Primary Examiner*—David L. Stewart

*Attorney, Agent, or Firm*—Edelson and Udell

[57] ABSTRACT

A data terminal utilizes a time division multiplexer to monitor traffic on 16 input lines and convert the information from parallel to serial form as a 16 word serial message, records the count data for each input line, and transmits accumulated count data over a phone line as a serial message of 16 sequential 16 bit words. The terminal has a Count Register and a Storage Register each of which is a 256 bit serial shift register. The Count Register is the active memory that stores the counts of the events as they occur while the Storage Register receives data from the Count Register periodically, and holds the data for transmission. The terminal operates in either cumulative or peak modes. In cumulative mode the count for each input line is transmitted when the terminal is interrogated. In peak mode the terminal stores and transmits for each line only the highest count which occurs during successive selected time intervals, such as an hour or half hour. In both modes data is transferred from the Count Register to a Comparator for comparison with data in the storage Register and the higher count is retained in the Storage Register. Incoming data continues to be received and the counts in the Count Register are incremented even during data transfer. One terminal input circuit may be utilized to count elapsed monitoring time in minutes. A traffic usage scanner pulse is provided to activate a usage scanner. Operation of the terminal is automatic, and data readout and subsequent clearing of the registers and counters is controlled by the remote interrogating unit.

31 Claims, 15 Drawing Figures

| FIG. 3A | FIG. 3B |
|---|---|

INPUT BUFFER MULTIPLEXING

INPUT BUFFER MULTIPLEXING

COMPARATOR DATA TRANSFER

OUTPUT DATA TRANSFER

EVENT MONITORING TRANSCEIVER

This invention relates to event monitoring transceiver apparatus. More particularly, this invention relates to apparatus for monitoring a plurality of independent event generating systems, storing the monitored data in one of a number of modes, and transmitting the stored data to a remote interrogating device upon command from the latter.

For illustrative purposes the invention will be described and illustrated as embodied in an automatic traffic monitoring terminal used for the automatic collection of telephone traffic data at PBX telephone switching offices. The terminal is physically small and is located at the PBX location, and data will usually, but not necessarily, be collected during the day hours with interrogation of the system proceeding at traffic off-hours by a remote computer control center or a remote receiver/teletype converter unit.

The traffic data monitored could be for example the number of calls on a given trunk or group of trunks, the number of times all trunks were busy, the number of times a line finder is busy, or any other "event" which is monitored by some particular piece of equipment that provides a signal proper for recording by the terminal. In the past, this traffic data would normally be determined perhaps once a year by telephone company personnel who would visit each PBX and check the mechanical counters therein. This is a very inaccurate method of data collection since it can provide only cumulative counts, and there is no way of determining heavy and light traffic condition occurrences on a time basis, or whether a particular count has exceeded the counter capacity and by how much.

Briefly, the illustrated terminal embodiment of the invention utilizes a time division multiplexer to monitor traffic on a maximum of 16 input lines to convert the information from parallel to serial form, although it is to be understood that any number of lines may be so monitored. The terminal records the count data for each input line in a 16 bit "word," the last 14 bits of which contain the count data in binary form with the first two bits being control bits. Accordingly, the illustrated sixteen line terminal utilizes a 16 word message in serial form, so that under interrogation by the control center, the terminal transmits accumulated count data over a phone line as a serial 256 bit message of sixteen sequential 16 bit words, the entire 256 bit message being repetitively transmitted until terminated by the interrogating control center. The 14 bit data count provides a line count capability of 16,383. Higher count capability could of course be obtained by increasing the number of bits per word as desired and suitably modifying the system timing as necessary.

The terminal has two 256 bit serial shift register memories, one of which is a Count Register and the other of which is a Storage Register. The Count Register is the active memory that stores the counts of the events as they occur while the Storage Register receives data from the Count Register periodically, and holds the data for transmission. Data in the two registers are grouped as 16 serial register words of 16 bits each. Each 16 bit word contains the event count for one of the input lines.

The terminal can operate in either of two modes, cumulative or peak. In the cumulative mode the total accumulated count for each input line is transmitted when the terminal is interrogated. In the peak mode the terminal stores and transmits for each line only the highest count which occurs on each line during successive time intervals of selected length, such as an hour or half hour. In both the cummulative and peak modes data is transferred from the Count Register to a Comparator once a second. As data is being so transferred, comparison is made of the data in the Count Register words and the corresponding Storage Register words and the higher count is retained in the Storage Register. Incoming data continues to be received and the counts in the Count Register are incremented even during data transfer. Since the transfer time for the entire 16 lines or 256 bits is only 12ms, data skew is negligible. In the Peak Reading mode, an internal timer is set for either hour or half hour intervals. Data is accumulated in the Count Register for either one hour or half hour, and at the end of the timing interval the Count Register is reset to start accumulating data for the next timing period.

Provision is made so that one of the terminal input circuits which normally monitors an input line may be utilized to count elapsed monitoring time in minutes. Additionally, if an input line is connected to a traffic usage scanner, a traffic usage scanner pulse is provided by the terminal to activate the scanner and cause the latter to transmit back to the terminal the data monitored by the scanner. Once the terminal is connected to the PBX there are no operating procedures beyond turning the power on. Thereafter, operation of the terminal is automatic, and data read-out and subsequent initialization, or clearing of the registers and counters are controlled by the remote interrogating unit. If for any reason the terminal has to be re-initialized locally, turning the power off and then on clears all registers and counters to zero.

A primary object of the invention is to provide a novel event monitoring transceiver apparatus for monitoring a plurality of independent event generating systems, storing the monitored data in one of a number of modes, and transmitting the stored data to a remote interrogating source upon command of the latter.

Another object of the invention is to provide a novel event monitoring apparatus as aforesaid in which a count of the monitored events is continuously accumulated in a count register and is compared at preselected times with count data in a storage register, the higher of the two counts being retained in the storregister.

A further object of the invention is to provide a novel event monitoring apparatus as aforesaid in which a count of the monitored events is continuously accumulated in a count register and is compared at preselected times with count data in a storage register, the higher of the two counts being retained in the storage register, and the count register being cleared to prepare for accumulation during the next timing period between the pre-select-comparison times.

Yet another object of the invention is to provide a novel event monitoring apparatus as aforesaid including means whereby a remote interrogating source is enabled to clear all counters and registers in the apparatus at any desired time.

Another object of the invention is to provide a novel event monitoring apparatus as aforesaid wherein data is read into the apparatus from a plurality of simultaneously monitored sources through a multiplexing parallel-to-serial converter to provide data input to the apparatus data processors in serial binary form at a first information rate, and wherein the processed data is read out of the apparatus and transmitted to an interrogating source at a slower second information rate.

The foregoing and other objects of the invention will appear fully hereinafter from a reading of the following specification in conjunction with an examination of the appended drawings, wherein.

Figure 1:
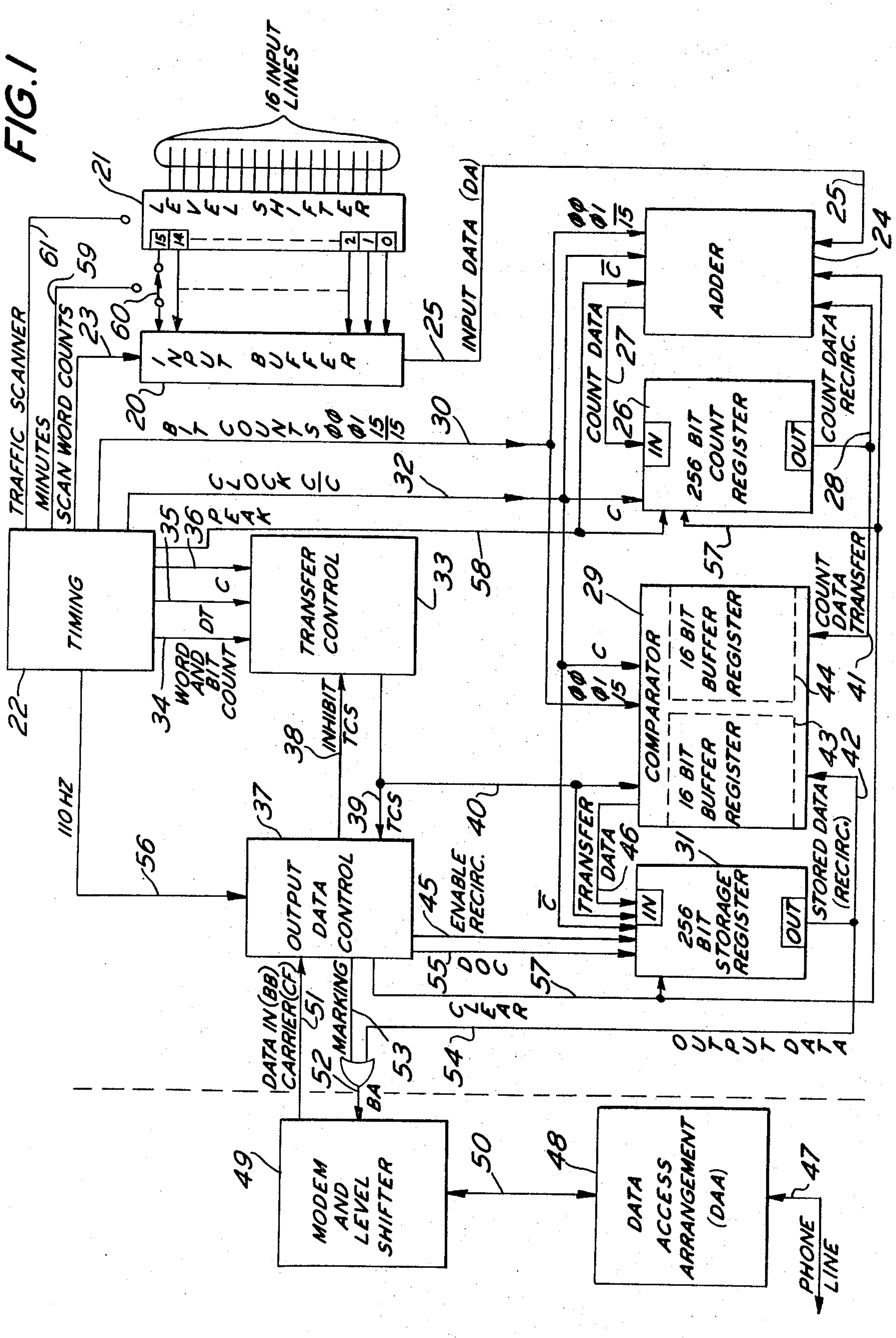
FIG. 1 is an overall functional block diagram of the apparatus according to the invention.
Figures 3, 3A:
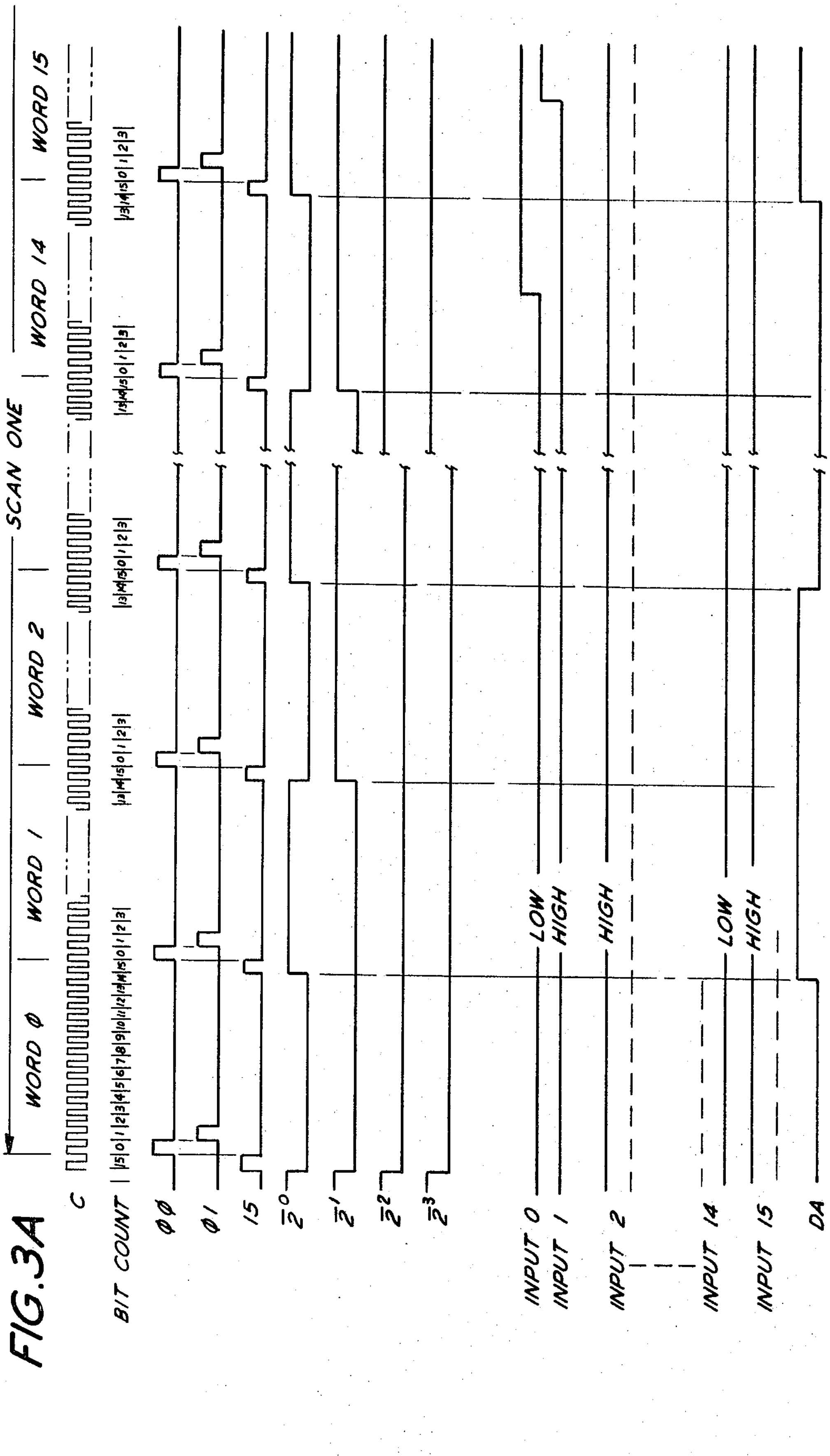
Figure 3B:
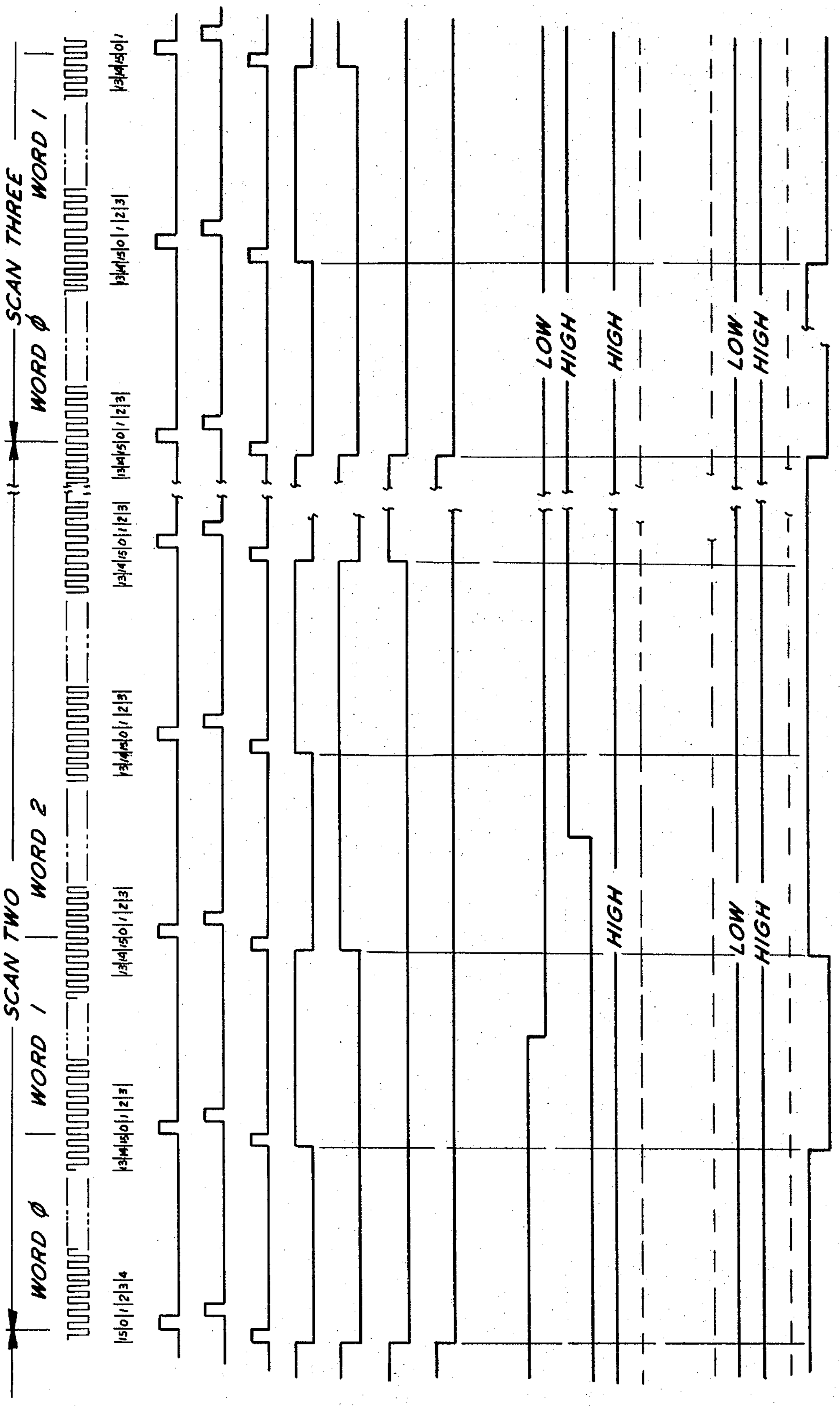
Figures 4, 8:
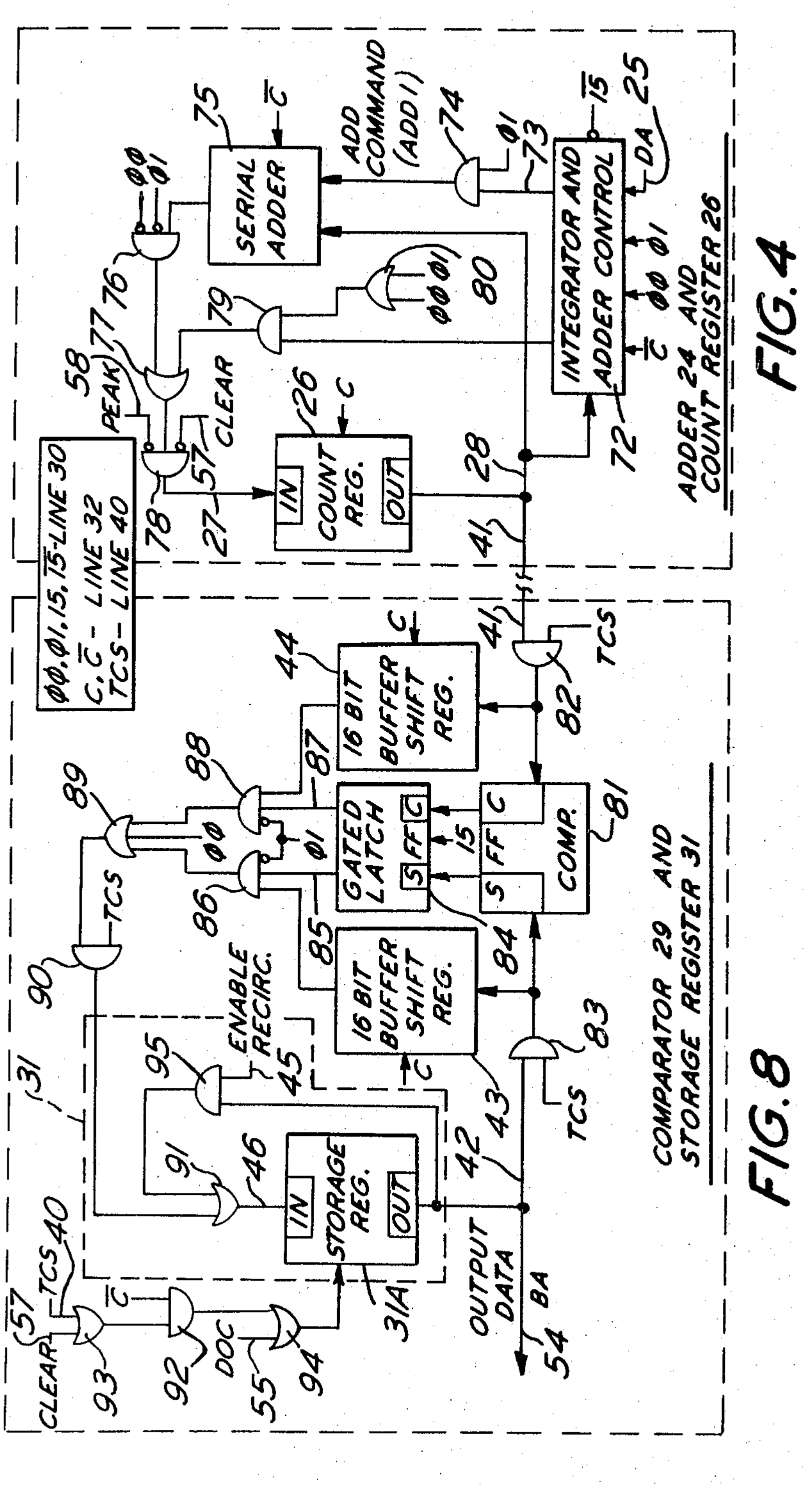
Figure 5:
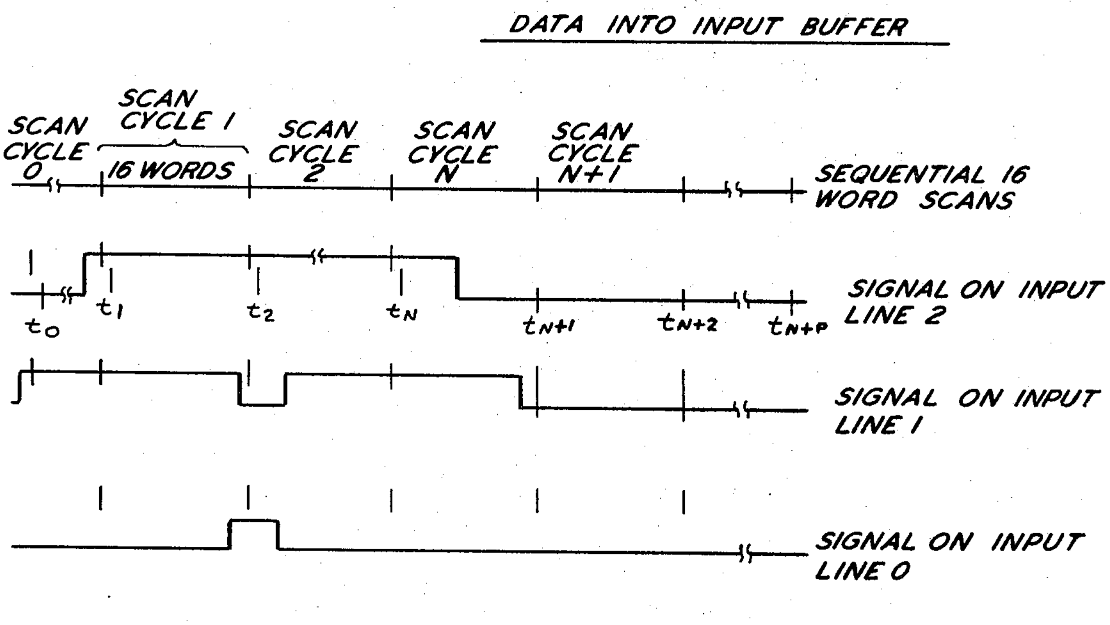
Figure 6:
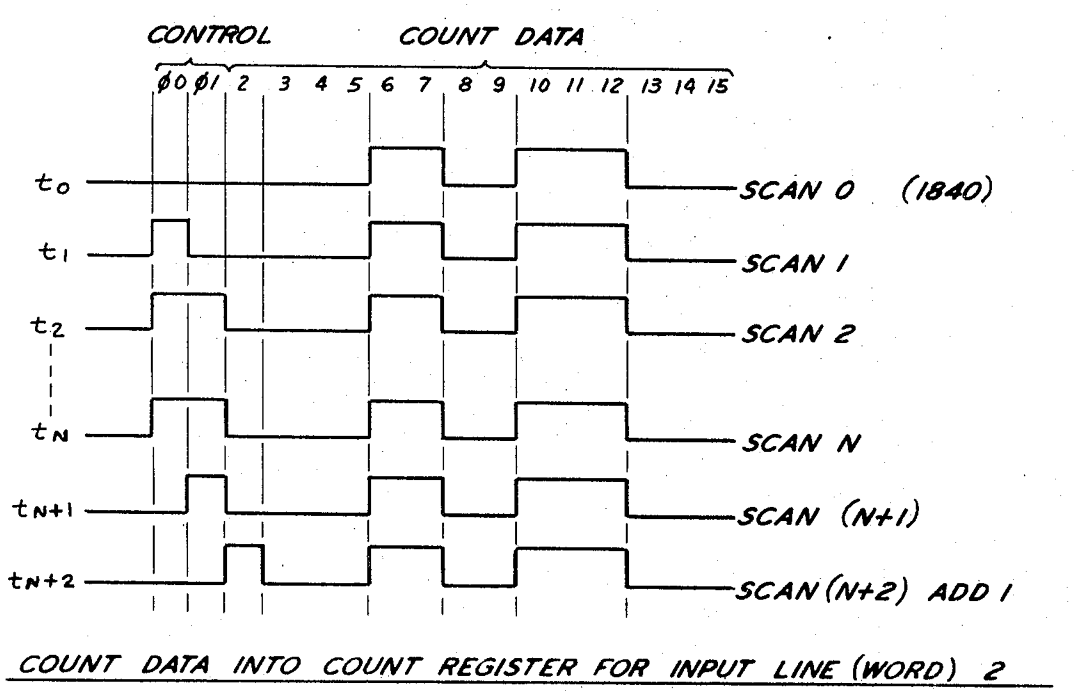
Figure 7:
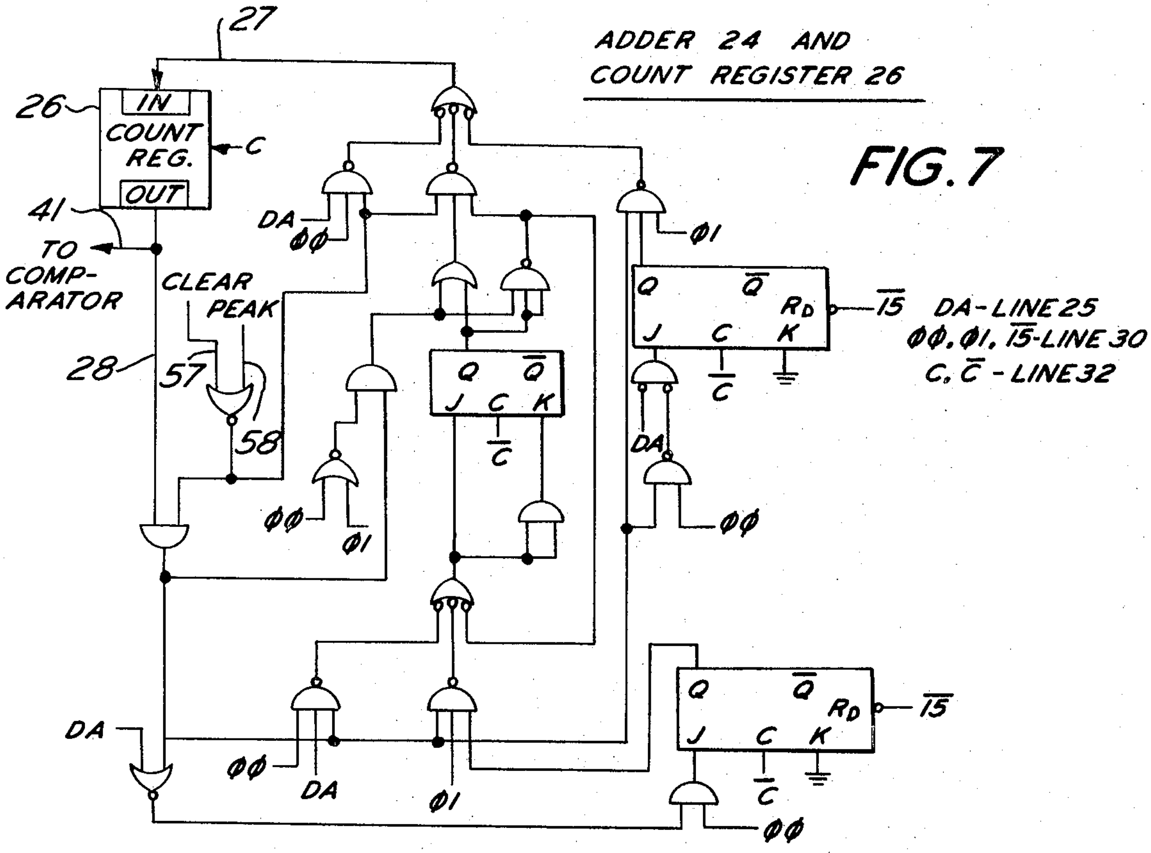
Figure 10:
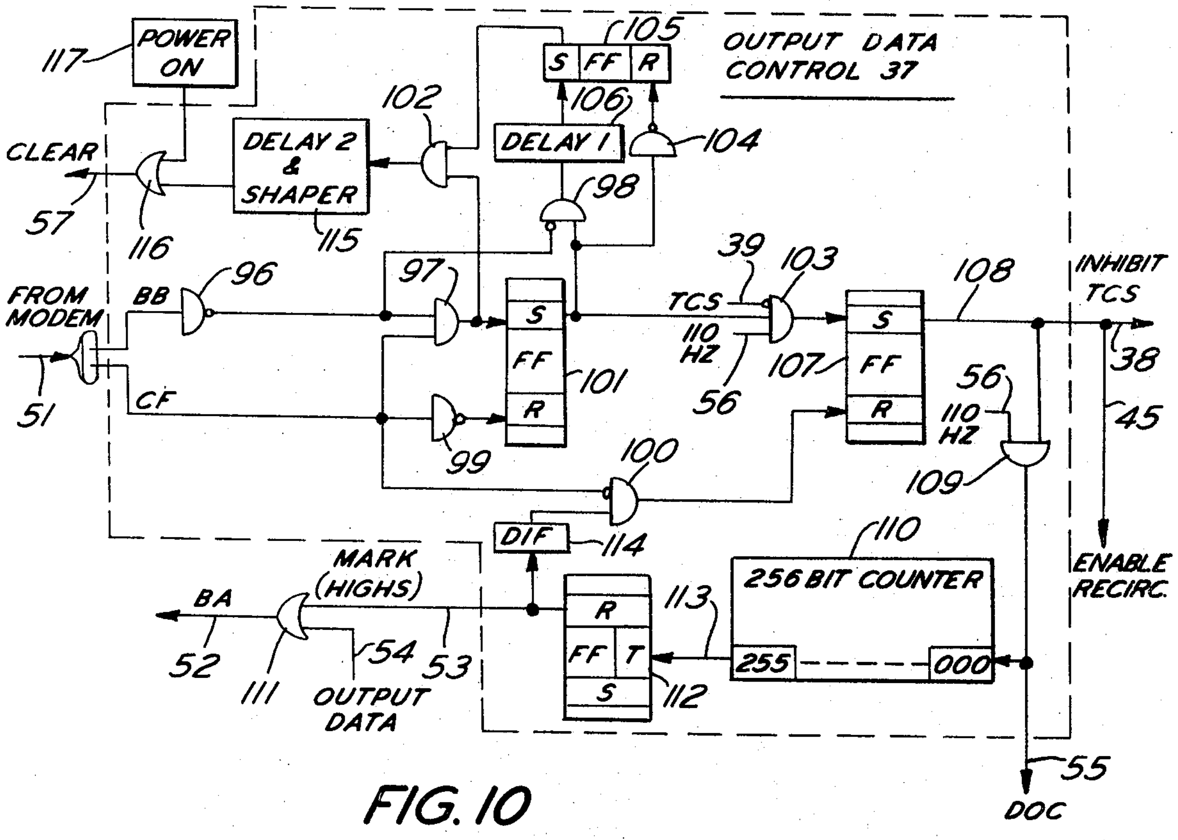
Figure 9:
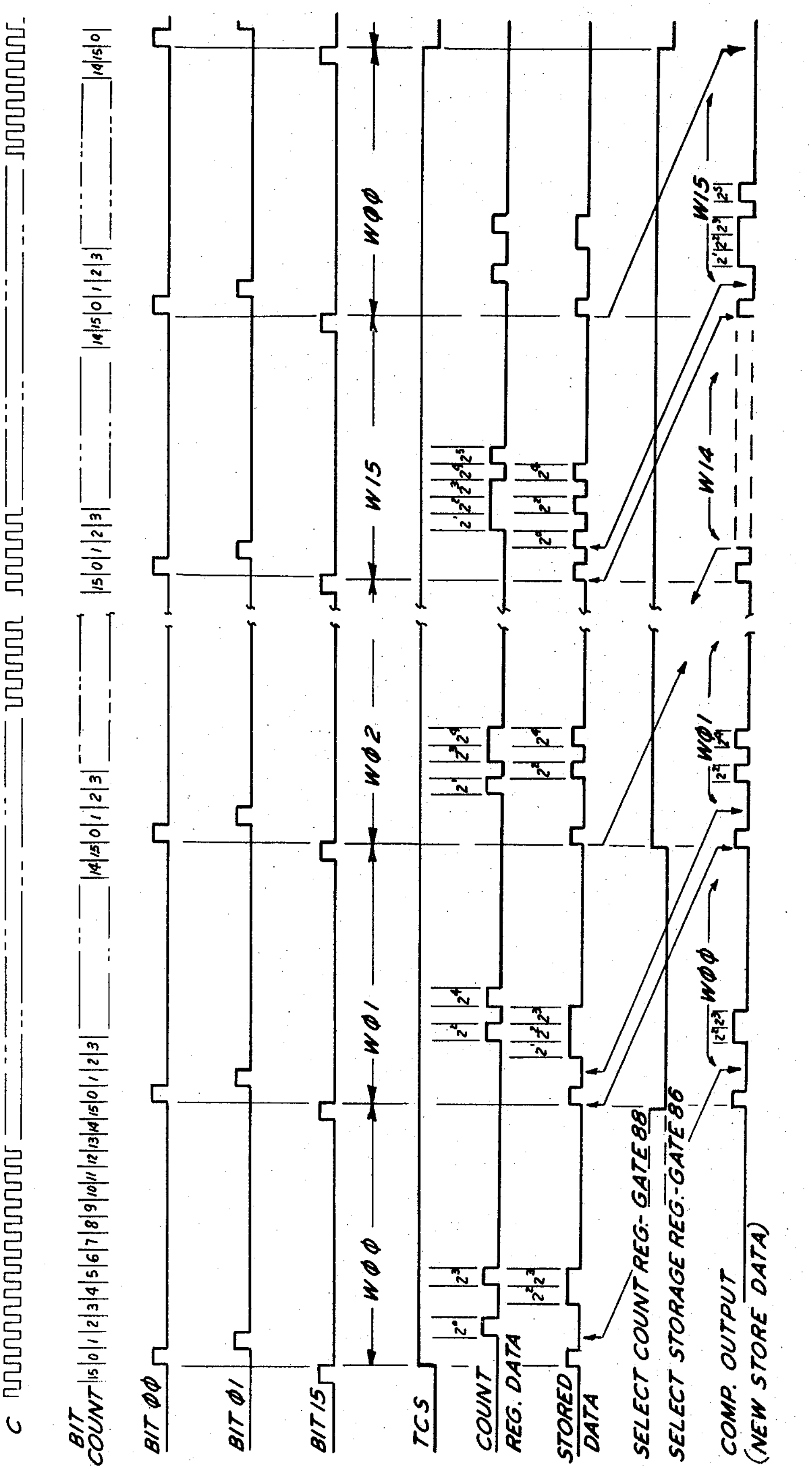
Figure 11A:
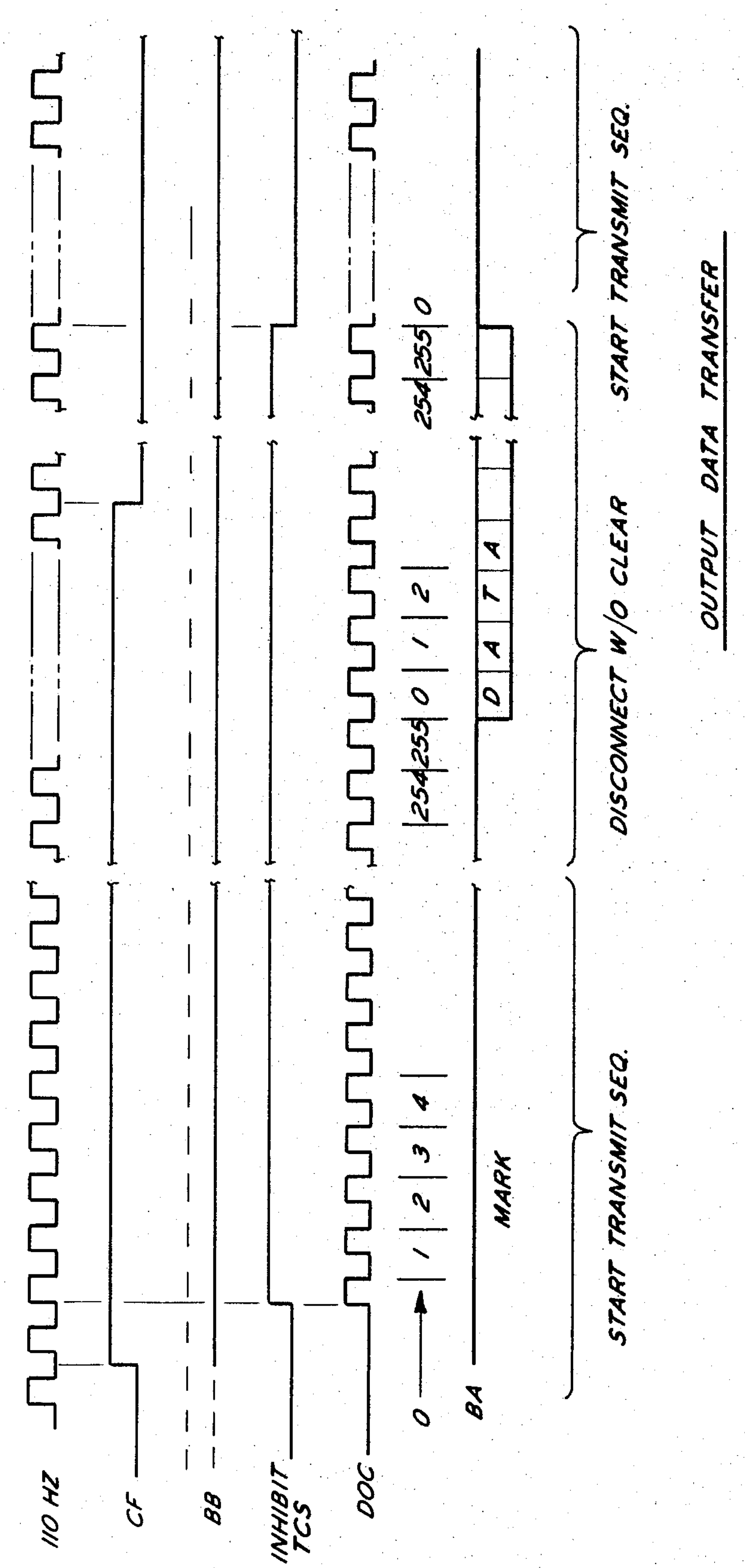
Figure 11:
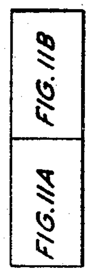
Figure 11B:
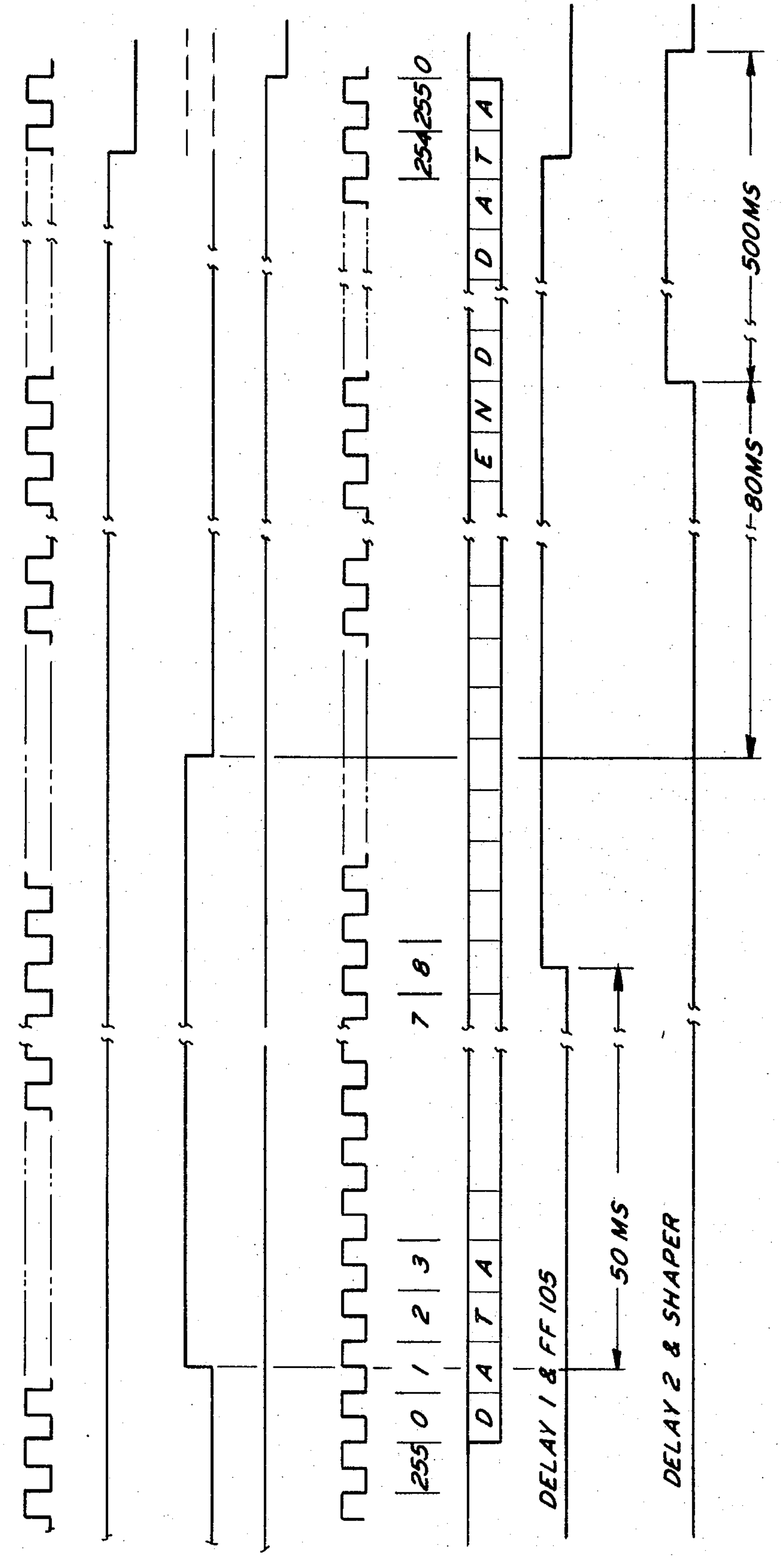

FIGS. 3A and 3B, arranged as shown in FIG. 3, represent a timing diagram of Input Buffer multiplexing illustrating parallel-to-serial data conversion;

FIG. 4 is a more detailed logic diagram of the Adder and Count Register functional blocks 24 and 26 of FIG. 1;

FIG. 5 is a multiple scan cycle timing diagram showing three types of signal conditions on three different Input Buffer lines;

FIG. 6 is a timing diagram showing the sequence in the addition of a count for input line 2;

FIG. 7 is a detailed logic diagram of the entire Adder 24;

FIG. 8 is a more detailed logic diagram of the Comparator and Storage Register functional blocks 29 and 31 of FIG. 1;

FIG. 9 is a timing diagram illustrating the data transfer process involving the Count and Storage registers and the logic scheme of FIG. 6;

FIG. 10 is a more detailed logic diagram of the Output Data Control functional block 37 of FIG. 1; and FIGS. 11A and 11B, arranged as shown in FIG. 11, are a timing diagram illustrating the process of output data transfer under control of a remote interrogating source.

In the several figures, like elements are denoted by like reference characters.

Figure 2:
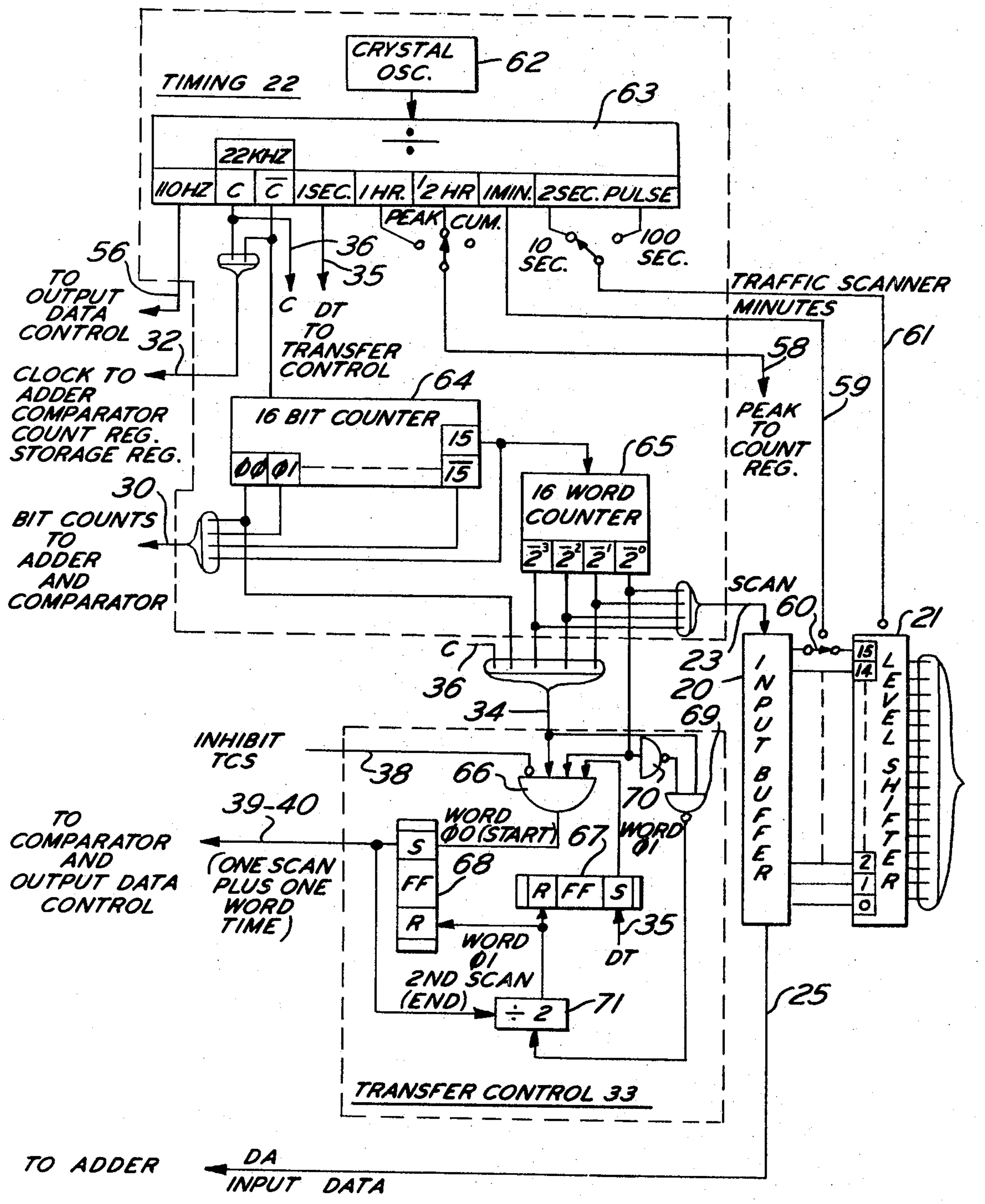
FIG. 2 is a more detailed logic diagram of the Timing logic and Transfer Control logic functional blocks 22 and 33 of FIG. 1.

A more complete understanding of the invention can best be had by first considering the overall operation of the apparatus, and then considering the detailed means for carrying out the various sequential operations. Accordingly, the invention as embodied in the illustrated apparatus is hereinafter described in the following sections:

GENERAL DESCRIPTION — FIG. 1
TIMING AND INPUT BUFFER MULTIPLEXING — FIGS. 2,3
EVENT DETECTION AND COUNT INCREMENTING — FIGS. 4,5,6,7
COUNT REGISTER TO STORAGE REGISTER DATA TRANSFER — FIGS. 8,9
OUTPUT DATA TRANSFER - FIGS. 10, 8, 11

GENERAL DESCRIPTION - FIG. 1

As shown in the functional block diagram of FIG. 1, up to 16 input lines are connected to the terminal at the Input Buffer 20 through a level shifter 21 which latter changes the input lines levels to be compatible with the terminal circuits. A series of SCAN WORD COUNT pulses from the Timing logic 22 is routed to the Input Buffer, which is a parallel-to-serial time division multiplexer, via a four conductor group designated as line 23. The SCAN WORD COUNT pulses from the Timing logic are binary coded and cyclically produce successive counts from 0 to 15 as determined by the four-conductor pulse coding. The count is decoded by the Input Buffer to sequentially select successive input lines, each line corresponding to the same numbered word in the terminal scan cycle, and the signals on which lines are gated through the Input Buffer onto the Input Data Line 25 and routed to the Adder 24 as a single serial Input Data signal DA.

If the Input Data signal for any input line should show data present for two or more consecutive scan cycle pulses for the same input line and then show data absent for two or more consecutive scan cycle pulses for the same input line, the Adder 24 will increment the count for that line by one. A terminal scan cycle in the illustrated case is 16 word times so that the minimum elapsed time necessary to cause a count to be added to the Count Register for any particular input line will be 3 × 16 word times or 48 word times. The counts for each line are stored in the Count Register 26 and recirculated continuously through the Adder logic via Count Register input and output lines 27 and 28 respectively.

Bit counts 00 and 01 from the Timing logic 22 are sent to the Adder 24 and Comparator 29 via line 30 to perform timing and control functions for recognizing input signal duration and to identify the beginning and the end of each of the 16 16-bit line registers of the Count Register 26 and Storage Register 31. Timing control clock pulses $c$ and $\bar{c}$ from the Timing logic 22 are routed to the Adder 24, Count Register 26, Comparator 29 and Storage Register 31 via line 32.

Word and bit count pulses, a one second interval timing pulse DT and a 22KHZ clock pulse c are routed from the Timing logic 22 to the Transfer Control logic 33 via lines 34, 35 and 36 respectively where they cause the cyclic generation of a TCS signal once each second unless prevented from doing so by an INHIBIT TCS signal received from the Output Data Control logic 37 via line 38. The TCS signal is routed to the Output Data Control logic 37 via line 39 where while present it prevents the initiation of a data read out from the Storage Register 31. At the same time the TCS signal is routed to the Comparator 29 and Storage Register 31 via line 40 where it enables transfer of Count Register 26 data via line 41 and Storage Register 31 data via line 42 to the Comparator 29.

The Comparator 29 receives the serial data from both registers and compares the magnitude of the counts in each 16 bit line register as simultaneously the bits are stored in the two 16-bit Buffer Registers 43 and 44. The data from the 16 bit Buffer Register with the larger count is then transferred to the Storage Register. After 256 bits have been transferred out of the Count and Storage Registers and comparison has been performed, the TCS signal remains up for another 16 bit period to allow transfer to the Storage Register 31 of the last 16 bits in the particular Buffer Register 43 or 44 which comparison has shown to be of larger magnitude.

The INHIBIT TCS signal from Output Data Control 37 is also the ENABLE RECIRCULATE signal which is routed to Storage Register 31 via line 45 where it permits recirculation of the Storage Register data via line 46 during a data readout to the interrogating source, during which time data transfer from the Count Register to the Storage Register does not take place because the TCS signal is inhibited. Data transmission out of the terminal is activated when a call from the interrogating source is terminated to the phone line 47 by the Data Access Arrangement (DAA) 48 which typically could be a Western Electric type 1001A.

When the DAA 48 receives an external ring signal on the phone line 47 it closes the telephone loop by connecting the telephone line 47 to the Modem and Level Shifter Unit 49 via line 50. The Modem unit 49 is a modulator/demodulator which typically could be a VADIC 80154-11 demodulator and 80004-11 modulator, which upon connection to the telephone line 47 by the DAA 48 generates a group of signals as set forth in EIA (Electronic Industries Association) Standard RS-232-B for an interface between data processing terminal equipment and data communication equipment. These signals are shown on the block diagram of FIG. 1 as DATA IN (BB) and CARRIER (CF) which are control inputs on line 51 to the Output Data Control logic 37. The terminal output signal designated as BA on terminal output line 52 is routed through the Modem 49 and DAA 48 to the telephone line 47.

When the interrogating source desires data transmission out of the terminal, it places a marking frequency on the line 47 which is recognized in the Modem 49, and the DATA IN (BB) and CARRIER (CF) signals are transmitted to the Output Data Control logic 37. The Output Data Control logic starts the output sequence by first transmitting a marking level on the Output Data (BA) line 52, via line 53, for a 256 bit period and then causing the marking period to be followed by the 256 bit output message from the Storage Register store 31A via Output Data line 54. The data read out from the Storage Register 31 is effected by the DOC signal to the Storage Register from the Output Data Control logic via line 55. The DOC signal is a 110HZ clock signal from the Timing logic 22 which is routed to the Output Data Control via line 56 and is selectively gated out to the Storage Register. The output data transmission rate is accordingly 110 baud which is of course extremely slow compared to the terminal internal clock rate of 22KHZ. At the same time, the Storage Register data is also recirculated by means of the ENABLE RECIRCULATE signal on line 45, so that unless a CLEAR signal is generated, the data is retained.

As long as connection is maintained by the interrogating source the 256 bit message is recirculated through the Storage Register and will continue to be sent with a 256 bit marking period separating each message. If the interrogating source shifts the level of BB from marking to spacing and then shifts back to marking level before disconnecting, a CLEAR signal is generated by the Output Data Control logic 37 and is routed via line 57 to the Adder 24, Count Register 26 and Storage Register 31 where it initializes or clears these registers and the Adder counters to zero. If the line 47 is disconnected without the preceding mark-space-mark sequence the registers and counters will remain undisturbed because the Output Data Control logic generates enough 110HZ DOC shift pulses to insure that the 256 bit data is aligned correctly in the Storage Register 31. When the terminal is operating in the peak mode, the Timing logic 22 generates a PEAK signal on line 58 once each hour or half hour as selected and clears the Count Register and Adder counters to zero.

A previously described, the Timing logic 22 generates a timing signal once each minute which may be inserted into one input line of the Input Buffer 20 via line 59 and selector switch 60 to provide a count in minutes of elapsed monitoring time. Also as previously described, a traffic scanner pulse is provided via line 61 from the Timing logic 22. The Input Buffer is a standard multiplexer as for example available from Signetics, Motorola, Texas Instruments and other manufacturers, and the Count and Storage Registers are standard integrated circuits also available from the same manufacturers.

TIMING AND INPUT BUFFER MULTIPLEXING — FIGS. 2, 3

Considering first FIG. 2, it is seen that the timing logic 22 comprises a crystal oscillator 62 whose output is fed into a frequency dividing network 63 which in turn produces an array of different timing signals indicated along the lower margin of the dividing network 63. The signals generated are, from left to right, the 110Hz output data transmission clock pulse in the form of a square wave train which is utilized to trigger the Storage Register 31 for data read out at the 110 Hz rate. The 22 KHz square wave clock pulse train is the basic timing signal used in the transfer and processing of data within the terminal, and both the clock pulse c and its inverted form $\bar{c}$ are employed. The one second DT signal occurs at one second intervals and the pulse width is two-tenths of a second. The 1-hour and one-half-hour pulse signals are used in the peak reading mode and are utilized to clear the Count Register at the selected interval so that data accumulation starts from zero for the next hour or half hour timing interval. The one minute signal on line 59, as previously explained, may be inserted into the Input Buffer on one of the input lines to record the elapsed monitoring time in minutes. Selection of this option of course decreases the maximum number of input lines which can be monitored. As previously described, the TRAFFIC SCANNER signal on line 61 is a two second pulse which is generated every ten seconds or one-hundred seconds, as selected, for use at the input/output connector with a remote traffic scanner device.

The clock pulse $\bar{c}$ is routed to a 16-Bit Counter 64 which counts successive pulses and generates output pulse signals used throughout the apparatus, these output signals being the 00, 01, 15 and $\overline{15}$ bit count signals which are each 45 microseconds in duration and occur once in every 720 microseconds. The bit count pulse 15 is routed to the input of the 16-Word Counter 65 which produces a four bit binary coded output corresponding to the sequential word count. All four coded outputs from the 16-Word Counter 65 are routed via line 23 as the SCAN WORD COUNT signals to the Input buffer 20, where, as previously described, they are decoded at the Input Buffer matrix to successively sequentially select the input lines into the Input Buffer so that the signal conditions on the lines can be examined and gated out onto the Input Data Line 25.

The four output lines of the 16-Word Counter 65 are also routed to Tranfer Control input "and" gate 66 together with a clock pulse c and a 00 timing bit, thus establishing one of the conditions for the "and" gate 66 to be that word 00 of the sequence is being examined at the Input Buffer. Consequently, at the 00 bit time of the 00 word, the input to "and" gate 66 is up from the previously occurring one second DT signal which will have set flip flop 67. If the terminal is not in the process of output data transmission, there will be no INHIBIT TCS signal on line 38, and the signals on "and" gate 66 will be passed through to set flip flop 68 and generate the TCS signal on line 39–40 at bit 00 of word 00 of the sequence. Accordingly, as will be subsequently seen from a consideration of FIG. 8, data transfer to the Comparator 29 from the Count Register 26 and Storage Register 31 commences at this time.

The count lines showing counts $\bar{2}^1$, $\bar{2}^2$ and $\bar{2}^3$ from the word counter 65 are also routed as a signal to inverter "and" gate 69 so that this gate is inhibited unless the count on all of these lines is zero. Additionally, the count line $\bar{2}^0$ from the 16-Word Counter 65 is routed to the inverter "and" gate 69 through inverter 70 so that when the $\bar{2}^0$ count occurs in the 16-Word Counter 65, representing word 01 of the sequence, this signal also appears at "and" gate 69 where the coincidence produces an output from the gate to the divide-by-two counter 71. The generation of the TCS signal one word time earlier has enabled the counter 71 so that a first count is entered in the counter. When the entire sixteen word scan sequence has been completed and the 00 bit of word 01 of the next scan sequence is generated, a second signal is transmitted through the inverter "and" gate 69 to the counter 71 which latter thereupon generates an output signal which resets flip flops 67 and 68 and terminates the TCS signal.

The TCS scan interval is therefore one scan sequence time plus one word time in length, the additional word time being necessary to return the last word to the Storage Register 31 from the selected 16 bit Buffer Shift Register which contains the last comparison made. Since flip flop 67 has been reset, input "and" gate 66 is shut down for the remainder of successive scan cycles until the next DT pulse occurs almost one second later to again set flip flop 67 and condition the input gate 66.

FIG. 3 illustrates the multiplexing arrangement of the Input Buffer 25 to which attention should now be directed.

FIG. 3 illustrates the manner in which the signal on the Input Data Line 25 is generated as determined by the conditions on each of the input signal lines, lines 0, 1, 2, 14 and 15 being shown for illustrative purposes, and by the condition of the multiplexer line selection count shown in the four selector signal lines labeled as $\bar{2}^0$, $\bar{2}^1$, $\bar{2}^2$, and $\bar{2}^3$. The system timing is shown by the clock pulse labelled c, by the bit count line showing the time position of each of the 16 bits within each word, and by the 00, 01 and 15 bit count pulses. From the Timing logic 22 of FIG. 2 it is observed that the Word Counter 65 changes its count at the 15-bit time, and from FIG. 3 it will be observed that the count as shown in the Word Counter lines $\bar{2}^0$, $\bar{2}^1$, $\bar{2}^2$, and $\bar{2}^3$ changes with the occurrence of each fifteenth bit.

Considering first scan sequence 1, it is observed that all four word counter lines are low designating word 00. Accordingly, input line 0 is connected through the Input Buffer to the Input Data Line 25, and since the signal condition on input line 0 is low, (data absent) the data signal DA which appears on the Input Data Line 25 is also low and is shown to be such on the bottom timing line of FIG. 3 during word time 00. A 720 microsecond period in every approximately 12 millisecond scan cycle is the time interval provided in the DA signal for each input line. While input lines 1, 2 and 15 are shown to be at a high signal or "data present" condition, this signal condition does not appear on the Input Data Line because these lines are not selected during word time 00.

For word time 01 of scan cycle 1 the selected count is shown to have changed from 0 to 1 by the occurrence of a high on the $\bar{2}^0$ line with lows on the remaining Word Counter lines. The count is consequently equal to 1 and corresponds to word 01, so that input line 1 is gated through the Input Buffer to the Input Data Line 25. Since input line 1 is observed to be at a high signal state during this time, the signal DA on line 25 goes high and remains so during the entire word 01 time interval. When the next 15-bit occurs, the Word Counter lines change their count from 1 to 2 to connect input line 2 to the Input Data Line 25 as shown by the high signal state on the $\bar{2}^1$ word counter line and the low states on the remaining lines. The DA signal remains up therefore during word 02 time.

The process repeats continuously with the Word Counter lines sucessively changing their counts to determine which input line is then being connected to the Input Data Line 25 out of the Input Buffer, and as seen, the signal DA during each illustrated word time is exactly the same as the signal state on the corresponding input line. For example during scan 1 the DA signal is low during word 14 time and high during word 15 time corresponding to the signal states on input lines 14 and 15 during those respective times. Similarly, examination of the scan 2 and scan 3 input line conditions and the respective word times at which each input line is selected results in the signal DA shown on the bottom line of the timing diagram of FIG. 3 as a single continuous series of high and low, or "data present" and "data absent," signals.

EVENT AND COUNT INCREMENTING — FIGS. 4, 5, 6, 7

Referring now to FIG. 4, the event detection with respect to each of the input lines is carried out by the functional block 72 labelled Integrator And Adder Control which receives the input data DA from the Input Buffer indicating the presence of events on the sixteen input lines. This data is examined by the Integrator at the 00 bit time to determine whether a valid or invalid event has occurred on any particular input line, and if such an event has occurred, an output is generated on line 73 which is utilized to gate a 01 pulse through "and" gate 74 to produce in the Serial Adder 75 an "add 1" to the count which is then passing through the Serial Adder from the Count Register 26. Even though a 01 bit produces the add 1 additional count into the Count Register word, the actual count is incremented in the 02 bit position, which is the least significant bit position of the count data in a word.

The Integrator And Adder Control 72 determines whether valid data is present on the particular input line by counting two or more consecutive "data present" conditions on that line followed by two consecutive "data absent" conditions on the same line during successive scan cycles. If such conditions are found to exist for any given line, the signal is generated on line 73 to produce the additional count in the Serial Adder. The count register bits for all words are serially read out over line 28 and into the Integrator And Adder Control 72 while simultaneously being sent to the Serial Adder 75. The output from the Serial Adder 75 is routed to an "and" gate 76, the output of which is routed to an "or" gate 77 whose output is in turn an input to "and" gate 78.

The 00 and 01 bits are inhibit signals on "and" gate 76 so that these bit positions in the word then coming out of the Serial Adder 75 are always lows or "pulse absent" conditions so that the output from "and" gate 76 which is presented to the "or" gate 77 contains no data in the 00 and 01 bit positions, and only contains data in he 02 to 15 bit positions which are representative of the data count in the word. The data for the 00 and 01 bit positions of each word is inserted at "or" gate 77 as the output of "and" gate 79 which receives its inputs from the Integrator And Adder Control 72 and from "or" gate 80. Since "and" gate 79 only receives a gate opening signal during the 00 and 01 bit times from "or" gate 80, it only produces inputs to "or" gate 77 during these bit times. It is precisely the 00 and 01 bit times which hold the data that determines when a valid signal is present on one of the input lines and thereby determines when an additional count is inserted in the Serial Adder 75.

FIGS. 5 and 6 together with Table 1 appearing herinbelow illustrate the types of signal conditions which can appear on any of the input lines, and the manner in which the Integrator And Adder Control 72 discriminates amongst them to determine when the count for any particular word shall be incremented. Referring first to FIG. 5, it is seen that the upper line of the timing diagram shows a plurality of successive sequential 16 word scan cycles. During each scan cycle all 16 input lines are sampled by the multiplexer. The second waveform of FIG. 5 illustrates the signal condition on input line 2 corresponding to the presence of valid data, and the manner in which the signal causes a count to be incremented for word 02 of the 16 word sequence is illustrated in the timing diagram of FIG. 6 as well as in Table 1 below.

TABLE 1

| | | COUNT REGISTER OUT | | COUNT REGISTER IN | | | |
|---|---|---|---|---|---|---|---|
| | DA | 00 | 01 | 00 | 01 | ADD 1 | |
| | 0 | 0 | 0 | 0 | 0 | 0 | |
| | 1 | 0 | 0 | 1 | 0 | 0 | SCAN 1 |
| TRUE | 1 | 1 | 0 | 1 | 1 | 0 | SCAN 2 |
| DATA | 1 | 1 | 1 | 1 | 1 | 0 | SCAN 3 |
| | . | . | . | . | . | . | |
| SIGNAL- | . | . | . | . | . | . | |
| | . | . | . | . | . | . | |
| INPUT | 1 | 1 | 1 | 1 | 1 | 0 | SCAN N |
| LINE 2 | 0 | 1 | 1 | 0 | 1 | 0 | SCAN N+1 |
| | 0 | 0 | 1 | 0 | 0 | 1 COUNT | SCAN N+2 |
| | 0 | 0 | 0 | 0 | 0 | 0 | SCAN N+3 |
| TRUE DATA | 1 | 0 | 0 | 1 | 0 | 0 | SCAN O |
| SIGNAL | 1 | 1 | 0 | 1 | 1 | 0 | SCAN 1 |
| WITH | 0 | 1 | 1 | 0 | 1 | 0 | SCAN 2 |
| NOISE | 1 | 0 | 1 | 1 | 1 | NO O COUNT | SCAN N(=3) |
| INTERRUPTION | 0 | 1 | 1 | 0 | 1 | 0 | SCAN N+1 |
| INPUT LINE 1 | 0 | 0 | 1 | 0 | 0 | 1 COUNT | SCAN N+2 |
| NOISE | 0 | 0 | 0 | 0 | 0 | 0 | |
| PULSE | 1 | 0 | 0 | 1 | 0 | 0 | |
| INPUT LINE 0 | 0 | 1 | 0 | 0 | 0 | 0 | |

Assume that data has been circulating through the Count Register 26, and that in the manner previously described the 00 and 01 bit position of word 02 of the register have been cleared at "and" gate 76, and that the times $t_0$ through $t_{N+2}$ shown in FIG. 5 all occur during the sampling times for the input line 2 and accordingly represent the signal state DA on the Input Data Line 25. This is shown in Table 1 under the column DA. At time $t_0$ input line 2 shows a "data absent" condition so that the DA signal is a low or 0 as shown in Table 1. The 00 and 01 bits for word 02 out of the Count Register 26 are also zeros and consequently these 00 and 01 bits remain at zero when they are recirculated back into the input of the Count Register.

The top waveform of FIG. 6 illustrates the conditions at the Count Register and Adder during the scan cycle 0, showing an event count of 1840 as designated by the presence of bits in the 6, 7, 10, 11 and 12 bit positions of the word. At time $t_1$ during the next scan cycle 1, the DA signal has changed from a "data absent" to a "data present" condition so that the Integrator And Adder Control 72 of FIG. 4 inserts a data bit in the 00 bit position of word 02. When the next successive scan cycle appears, namely scan cycle 2, it is observed at $t_2$ that the "data present" condition on input line 2 continues to exist, and a bit is inserted by the Integrator 72 into the 01 bit position of word 02 so that bits are now present in both the 00 and 01 bit positions of the word.

Assuming that any number of subsequent cycles follow during which data is still present on input line 2, ending with a scan cycle N which is sampled at time $t_N$, nothing further occurs to the 00 and 01 bit positions of word 02 as is observed from Table 1 and the scan 2 and scan N waveforms of FIG. 6. At some point after time $t_N$ but prior to the next successive scan cycle N+1, the signal on input line 2 goes low corresponding to a "data absent" condition, and this "data absent" condition is sampled at time $t_{N+1}$ as a low or zero signal for DA. The Integrator 72 thereupon clears the 00 bit position. On the next scan cycle at time $t_{N+2}$ when input line 2 is again sampled, the "data absent" condition is again detected as a zero on the DA line and the Integrator 72 clears the 01 bit position and produces an output on line 73 causing a 01 bit to be gated through the "and" gate 74 to the Serial Adder 75. Accordingly, the word 02 count is incremented by 1 by the insertion of a bit in the 02 bit position of the word as shown in the bottom waveform of FIG. 6.

The third waveform of FIG. 5 designated "Signal on Input Line 1" represents a true data condition with a noise interruption, this waveform being shown in an expanded form in the timing diagram of FIG. 3, and being digitalized in the second group of data signals of Table 1. During scan cycle 0 and scan cycle 1 the "data present" condition is detected so that a 1 bit is inserted first into the 00 bit position and then into the 01 position of the input line 1 Count Register word 1. However, during scan 2 time, noise on the input line 1 causes the signal to drop low at the time when the line is sampled by the multiplexer, so that the DA signal looks like a low, an hence a clear-out of the 00 bit position takes place as seen in the scan 2 line of Table 1. During the next scan cycle, the noise burst has disappeared and the signal is restored to its high level which is properly sampled so that a 1 bit is reinserted into the 00 bit position for input line word 1. No count is incremented into the Serial Adder 75 because there has not occurred the necessary sequence of two or more successive scans of "data present" signal followed by two successive scans of "data absent" signal condition. During the next two successive scan periods when the multiplexer samples input line 1 and finds a "data absent" condition both times, the count incrementing condition has now been met, and with both the 00 and 01 bit positions of the word being cleared, a count is incremented by the Serial Adder 75 into the data count of word 1.

The bottom waveform of FIG. 5 illustrates the case of a "data absent" condition on input line 0 which includes the presence of a noise pulse at one of the sampling times for input line 0, and Table 1 shows how the sampled noise burst first causes a bit to be entered in the 00 bit position of word 00 followed by a clear-out of that bit during the next successive scan cycle. Obviously no incrementing count in the data word occurs because the necessary sampling conditions have not been met.

FIG. 7 shows the exact schematic logic diagram for the Adder 24 which is composed of standard logic building blocks such as "and" gates, "or" gates and J-K flip flops, together with the data signals and timing pulses which operate the logic.

COUNT REGISTER TO STORAGE REGISTER DATA TRANSFER —FIGS. 8,9

Referring now to FIG. 8, when the TCS signal is present from the Transfer Control logic 22, as previously described in connection with FIG. 2, the comparator flip flop 81 receives serial count data from the Count Register 26 and Storage Register 31 via lines 41 and 42 through "and" gates 82 and 83 which are enabled by the TCS signal. The comparator flip flop 81 compares these bits for magnitude, one register word or sixteen bits at a time, and sets or restores the flip flop in accordance with which input is then inputting a bit. If neither or both registers are inputting a bit at a given bit time, flip flop 81 does not change its state. If only one register is inputting a bit, the state of flip flop 81 is conformed to that input. That is, if the Storage Register 31 were inputting a bit to the comparator flip flop 81 and the Count Register 26 had no bit present at that particular bit time, then the comparator flip flop 81 would be set to produce an S output (corresponding to Storage Register). If on the other hand, the Count Register were inputting a bit and the Storage Register were not, the comparator flip flop would be shifted to its C output state (corresponding to Count Register).

Consequently, during the continuous serial input to the comparator flip flop 81 from the Count and Storage Registers, the output state of the comparator flip flop 81 is shifting back and forth between the S and C states in accordance with the bit information being received during each bit time. While these ouput states of the comparator flip flop 81 are constantly being presented to the gated latch flip flop 84, the gated latch flip flop makes no selection between the two until the bit 15 time when a bit 15 timing pulse gates through to the latch flip flop 84 whichever of the two states S or C is then exhibited by the comparator flip flop 81. If the Storage Register store 31A contained the higher count data, then the comparator flip flop 81 would be in its S state at bit 15 time and would cause the latch flip flop 84 to assume this state and to produce an enabling signal on its output line 85 to thereby enable "and" gate 86 to pass through the data read out from Buffer Shift Register 43. If on the other hand, the last data bits compared by the comparator flip flop 81 show that a higher count is present in the Count Register 26, then the gated latch flip flop 84 will be set to the C state by the bit 15 timing pulse to generate an enable signal on latch flip flop output line 87 to thereby enable "and" gate 88 and permit passage therethrough of the count data stored in Buffer Shift Register 44.

It will be appreciated, that as the data bits are being serially compared by the comparator flip flop 81, they are also being read into the two 16-Bit Buffer Registers 43 and 44 and are moved through these registers toward their output ends by the clock pulses c which synchronize the Count Register and Storage Register data. Consequently, when the gated latch flip flop 84 is set by the bit 15 pulse to open either output "and" gate 86 or 88, the 00 bit of word just compared is just reaching these output "and" gates. Whichever of the "and" gates is open, will pass th count data from the corresponding Buffer Register therethrough, and this data will in turn be passed through "or" gate 89, "and" gate 90 wich is enabled by the TCS signal, and "or" gate 91 back into the Storage Register 31. Since a 16 bit, or one word, delay is encountered by the 16 word contents of the Count Register and Storage Register as they pass through the Buffer Shift Registers, a 17 word or 272 bit time is necessary to carry out a complete comparison cycle, and this is provided by the 272 bit time length of the TCS signal.

It should be noted that a bit is inserted at the 00 bit time by a 00 timing bit at "or" gate 89 so that all words which return to the Storage Register 31 have a "one" bit in the 00 bit position. This "one" bit is the "stop" bit for output data transmission as will be subsequently described. Similarly, it is observed that both of the gated latch flip flop output gates 86 and 88 are inhibited by a 01 bit so that the 01 bit position of all words returning to the Storage Register is in a cleared or "zero" bit condition. This "zero" bit is the "start" bit for output data transmission as will also be subsequently described. The count data is accordingly placed in the 02 through 15 bit positions.

The Storage Register 31, unlike the Count Register 26 and Buffer Registers 43 and 44 is a static register in which the stored data normally is not being continuously recirculated into and out of the register, but is stored there in static condition. The stored data is moved through the Storage Register store 31A only under two circumstances, namely, during a data comparison with data of the Count Register, or when a remote interrogating source has established the conditions for transmission of data out of the terminal and over the phone line 47 to the interrogating source.

Data comparison with data in the Count Register has already been described, and during this operation, the data in the Storage Register 31 is moved out of the register and into the Comparator 29 network by means of clock pulses $\bar{c}$ which are gated through "and" gate 92 by means of the TCS signal then present on "or" gate 93. The TCS signal gates the clock pulses $\bar{c}$ through the "and" gate 92 and through "or" gate 94 to move the data out of the Storage Register 31 and into the Comparator. This data circulation continues of course only so long as the TCS signal is present to gate the clock pulses $\bar{c}$ through "and" gate 92, and terminates when the TCS signal terminates, thereby returning the Storage Register 31 to the state of a static register.

As will be subsequently seen, during output data transmission, the DOC signal is generated which passes through "or" gate 94 to step the data serially out of the Storage Register 31. The data moving out of the Storage Register, in addition to reading out over the Output Data Line 54, also recirculates via line 42 and "and" gate 95 back into the Storage Register store 31A through "or" gate 91 because an ENABLE RECIRCULATE signal is at this time also present to open "and" gate 95. The TCS signal is of course not present and no comparison can occur.

The timing of the COMPARATOR DATA TRANSFER is illustrated in FIG. 9 to which attention should be now directed. The timing pulses for data transfer are shown in the first six lines of FIG. 9 and are respectively the clock pulse, the bit positions, bit 00, bit 01, bit 15 and the TCS signal. Lines 7 and 8 show the count data for each word in the Count Register and Storage Register respectively as well as the control bits for these register words. The Count Register control bits 00 and 01 are shown as zeros, indicating that none of the illustrated words are in the process of being incremented. All of the Storage Register words show a one bit in the 00 bit position and a zero bit in the 01 bit position, as previously described.

Considering word 00, it is observed that the count data in the Count Register for this word shows a count of nine while the count in the Storage Register word shows a count of twelve, and accordingly it should be expected that the result of this comparison will cause the storage data word to be read back into the Storage Register since it is the larger count. This is in fact illustrated on the bottom line of FIG. 9 in the word 01 time position in which Storage Register word 00 appears, illustrating the one word time delay due to the Buffer Shift Register.

The waveform immediately above the comparator output waveform shows which of the Buffer Shift Register output gates is selected as a function of the count comparison. As shown, at the beginning of word 01 time, Storage Register gate 86 is selected, corresponding to the fact of the larger count in the Storage Register for word 00. In contrast, at the beginning of 02 word time Buffer Register output gate 88 is selected so that during word 02 time, Count Register word 01 will be read out of the Comparator instead of Storage Register word 01 in view of the fact that Count Register word 01 shows a count of 20 whereas Storage Register word 01 shows a count of 14. The remainder of the words are operated upon in the same manner so that the end of word 00 time of the next sequence, word 00 out of the Comparator has been shifted into the word 00 position of the Storage Register 31, and the TCS signal is terminated to return the Storage Register 31 to its static condition with all of the words stored in their proper positions within the register.

OUTPUT DATA TRANSFER — FIGS. 10, 8, 11

The output data transfer prceeds in the manner previously described in the first section designated as GENERAL DESCRIPTION. The mechanism by which the output data transmission is controlled is shown in the logic diagram of FIG. 10 with the relevant waveforms being shown in the OUTPUT DATA TRANSFER timing waveforms of FIG. 11. When the interrogating source desires data transmission out of the terminal, it places a marking frequency on the phone line 47 which is recognized in the Modem 49, and which in turn generates the DATA IN BB signal and the CARRIER CF signal which are transmitted to the Output Data Control logic 37 via line 51. As shown on the timing diagram of FIG. 11, the transmitted BB signal is low and the CF signal is high. The low BB signal is passed through inverter 96 and emerges as a high which is routed to "and" gate 97 and also as an inhibit signal to "and" gate 98. The high CF signal is routed to "and" gate 97, to inverter 99 and as an inhibit signal to "and" gate 100. The inverted CF signal through inverter 99 appears as a low at the restore input of flip-flop 101 and therefore has no effect upon the flip flop.

The coincidence of the high CF and BB signals at "and" gate 97 gates through to the set input of flip flop 101 and becomes an enable signal on "and" gate 102. The set output of flip flop 101 goes high and places an enable signal on "and" gate 98 and "and" gate 103, and also passes through inverter 104 as a low to the restore input of flip flop 105 but has no effect on the flip flop state. Since "and" gate 98 is inhibited by the inverted BB signal, the set output from flip flop 101 cannot be gated through to the Delay 1 element 106 so that no CLEAR signal can be generated under the existing signal conditions. If no data transfer is taking place in the Comparator 29, the TCS signal will not be present as an inhibit signal on "and" gate 103 so that the set output from flip flop 101 gates through the next 110 Hz pulse to the set input flip flop 107, which causes flip flop set output line 108 to go high and generate the INHIBIT TCS signal on line 38 and the ENABLE RECIRCULATE signal on line 45.

The INHIBIT TCS signal prevents the generation of a TCS signal by the Transfer Control logic 33 so that data transfer into the Comparator 29 does not occur during this time. The ENABLE RECIRCULATE signal on line 45 is routed to "and" gate 95 of the Storage Register 31 to open the recirculation loop for Storage Register store 31A. Simultaneously, the high on line 108 is transmitted to "and" gate 109 as an enable signal which permits the passage therethrough of the 110 Hz square wave onto line 55 as the DOC signal and also as a pulsed input to 256 Bit Counter 110. The DOC signal is routed as the timing clock to the Storage Register 31 through "or" gate 94 of FIG. 8, and causes the Storage Register to read the data out onto the Output Data line 54 as the output signal BA, while also recirculating its data back to its input through "and" gate 95 and "or" gate 91.

The data from the Storage Register which is read out onto Output Data line 54 is routed to "or" gate 111. However, a high marking level is at this time also routed to "or" gate 111 over line 53 from the restore output of toggle flip flop 112. Toggle flip flop 112 is in its restored state, as will be subsequently understood, so that the high marking level exists at the "or" gate 111 and overrides whatever data is appearing on Output Data Line 54 from the Storage Register. Consequently, the output data signal BA on line 52 to the Modem unit for transmission over the phone line 47 is a marking level and contains no data. This condition is illustrated in FIG. 11 as the "START TRANSMIT SEQUENCE" shown at the left of the figure.

As each 110 Hz DOC pulse appears on line 55 it advances the count in the 256 Bit Counter by 1, so that when the counter has completed its 255th count and is about to step back to zero count, an output pulse is generated on line 113 to the toggle input of flip flop 112 and shifts the flip flop to its set state causing the restore output of the flip flop to go low. With the marking level no longer present on "or" gate 111, the data from the Storage Register 31 appearing on the Output Data Line 54 passes through "or" gate 111 and is transmitted out to the interrogating source.

Since the marking level was held for a period of 256 bit times, the Storage Register data has gone through one complete recirculation and is reading out at the beginning of word 00 of the register. It will be recalled from FIG. 9 that the first bit in the 00 position of each word in the Storage Register is a "one" bit, which is the same as the marking level. So that the 00 bit word 00 out of the Storage Register which is read out onto the Output Data Line through "or" gate 111 appears as a one bit continuation of the marking level. As previously pointed out this becomes the "stop" bit of the marking period, and the "zero" in the second bit position (01 bit) of word 00 becomes the "start" bit of the first sixteen bit word of the data transmission. Bits 03 through 16 in the Storage Register become transmitted as bits 02 through 15, and the 1 bit in the first or 00 bit position of the second 16 bit word appears as the "stop" bit for the first word. The transmitted message therefore appears as being shifted by one bit position from the message as stored in the Storage Register 31.

During the output data transmission time, the 256 Bit Counter 110 has continued to count 110 Hz pulses, and after counting 256 of these, produces another output on line 113 to toggle flip flop 112 to its restore condition and again put a marking level on the output transmission line 52 through "or" gate 111. When the restore output of toggle flip flop 112 goes high to generate the marking level, the leading edge is differentiated in differentiator 114, but the differentiated output cannot pass through "and" gate 100 to the restore input of flip flop 107 because of the inhibit condition on gate 100 due to the presence of the CF signal. Consequently, flip flop 107 remains in its set state, the DOC signal continues to be generated, and alternate periods of marking and data transmission continue until the interrogating source terminates the transmission by disconnecting.

The interrogating source can disconnect without generating a CLEAR signal or it can disconnect and casue the CLEAR signal to be generated. Both conditions are illustrated in the waveforms of FIG. 11, and will be described first as a disconnect without generation of a CLEAR signal, followed by the description of a disconnect with the generation of a CLEAR signal.

When the interrogating source disconnects without causing a CLEAR signal generation, it does so by dropping the carrier level CF low as shown on FIG. 11 in the bracketed section labelled "DISCONNECT W/O CLEAR." With the carrier low, gate 97 is no longer enabled, inverter 99 causes a high at the restore input of flip flop 101 thereby restoring the flip flop and causing the set output to go low. This removes the enable signal from "and" gates 98 and 103, thereby effectively closing these gates, and causes a high to be generated by inverter 104 to insure that flip flop 105 is in its restore state. While "and" gate 103 has been closed, flip flop 107 nevertheless remains in its set state since nothing has occurred to change it. With the carrier CF signal low, the inhibit on "and" gate 100 is also removed so that the next time differentiater 114 produces an output, the output will pass through gate 100 to the restore input of flip flop 107 and terminate the high set output signal on line 108.

As shown in FIG. 11, the CF signal goes low during the 02 bit count time, but the set state of flip flop 107 permits the continuation of transmission of DOC signal and the continued counting of 256 Bit Counter 110. When the counter has counted to 255, as shown in FIG. 11, it produces its output on line 113 and toggles the flip flop from its set condition to its restore condition causing a marking sequence to again go out over the transmission line but also now causing a differentiated pulse to be transmitted through gate 100 and restore flip flop 107, thereby terminating the DOC signal as well as terminating the INHIBIT TCS and ENABLE RECIRCULATE signals. The data transmission is thus completed and a marking level continues out over the line.

As shown in FIG. 11, the disconnect signal occurred during a data transmission when the toggle flip flop was in its set condition. The disconnect signal can of course occur at any time, and could just as well have occurred during the transmission of a marking level, in which event the marking transmission would be completed and would be followed by one more data transmission before termination occurred. Of course, the fact that data may still be read out onto data transmission line 52 after a disconnect signal is received, does not mean that such data is actually being transmitted to the interrogating source, inasmuch as the source has in fact disconnected from the phone line.

The disconnect and clear sequence will now be described. Assume that the "START TRANSMIT SEQUENCE" has already occurred and that transmission has been going on. Under this circumstance, flip flop 101 is in its set state so that gate 98 has an enable signal on it and "and " gate 102 is enabled by "and " gate 97. Additionally, the high BB signal output out of the inverter 96 is inhibiting "and" gate 98. As shown at the left hand end of FIG. 11B, during the 01 bit time while data is being transmitted, the BB level is suddenly raised so that the output of the inverter 96 goes low and removes the inhibit on "and " gate 98 thereby allowing the set output from flip flop 101 to be gated through to the Delay 1 element 106.

If the interrogating source holds the BB level shifted for longer than 50 milliseconds, the Delay 1 element passes out a pulse which sets flip flop 105 and places an enable signal on "and " gate 102. At this time, the input to "and" gate 102 from "and" gate 97 has gone low because of the shift in the BB level, so that no signal is gated through "and" gate 102 at this time. When the interrogating source now causes the BB signal to again be dropped low, inverter 96 again puts a high on "and" gate 97, and with the carrier CF signal still present, an output now gates through "and" gate 97 to "and" gate 102 and into Delay 2 And Shaper 115. If the carrier CF remains up and the BB signal remains low for 80 milliseconds or longer, then the Delay 2 And Shaper 115 generates a 500 millisecond CLEAR signal which is passed through "or" gate 116 to Clear line 57. When the CF signal drops low, the disconnect sequence is initiated as previously described.

The time delay provided by the Delay 1 element 106 differentiates a high BB signal "clear registers " command from a noise pulse, while the Delay 2 And Shaper 1115 insures that the carrier CF is still present and the BB signal has remained low for 80 milliseconds to differentiate the low BB signal from a noise pulse. The CLEAR signal on line 57 inhibits Adder gate 78 and thereby clears the Count Register 26, while also passing through "or" gate 93 to enable "and " gate 92 and permit $\bar{c}$ clock pulses to be gated therethrough and through "or" gate 94 to clear the Storage Register 31.

As shown, and as previously pointed out, a CLEAR signal is also generated by the Power On switch 117 when power to the terminal is turned on.

Having now described our invention in connection with a particularly illustrated embodiment thereof, it will be appreciated that modifications and variations of our invention may now occur from time to time to those persons normally skilled in the art without departing from the essential scope or spirit of our invention, and accordingly it is intended to claim the same broadly as well as specifically as indicated by the appended claims.

What is claimed to be new and useful is:

1. Event monitoring transceiver apparatus comprising in combination a. a parallel to serial electrical signal input multiplexer having a plurality of independent input circuits adapted for connection to a plurality of independent input-signal conductors, and having an output circuit, b. an adder having first and second data input circuits and a data output circuit, said first data input circuit being operatively coupled to said multiplexer output circuit, c. a count register having a data input circuit operatively coupled to said adder data output circuit, and having a data output circuit operatively coupled to said adder second data input circuit, said count register receiving and holding event count data from said adder for each said multiplexer input circuit, d. a comparator having first and second data input circuits and a data output circuit, said first data input circuit being operatively coupled to said count register data output circuit, e. a storage register having a data input circuit operatively coupled to said comparator data output circuit, and having a data output circuit oeratively coupled to said comparator second data input circuit, said storage register receiving and holding event count data from said comparator for each input multiplexer input circuit, f. an output control circuit adapted for coupling to and for receiving transmission control signals from an output data transmission circuit, and being adapted in response to the receipt of such transmission control signals to generate and transmit output control signals to said storage register, g. output means having an input circuit operatively coupled to said output control circuit and to said storage register data output circuit, and having an output circuit adapted for coupling to said output transmission circuit, and h. timing control means continuously generating timing control signals and being operatively coupled to and sending timing control signals to all of said input multiplexer, adder, count register, comparator, storage register and output control circuit, whereby, under control of said timing means, 1. said plurality of multiplexer input circuits are each cyclically selectively singly sequentially operatively coupled to said multiplexer output circuit for a predetermined time interval to thereby deliver to said adder first input circuit a sequence of electrical signals corresponding to the signal condition at each of said multiplexer input circuits during the time interval that the particular input circuit is coupled to the said multiplexer output circuit, 2. said event count data in said Count register for each input multiplexer input circuit is circulated through and is incremented by said adder when the latter detects the occurrence of a valid event at the input circuit then selected, 3. said event count data in said count register and said event count data in said storage register are both read into said comparator and the event count data from each of said count and storage registers which is of larger magnitude for each input multiplexer input circuit is passed out of said comparator and back into said storage register, 4. and when said output control circuit is receiving transmission control signals from said output data transmission circuit, said event count data in said storage register is shifted out of said storage register and through said output means under control of said output control circuit.

2. Apparatus as set forth in claim 1 wherein said adder comprises event occurrence validation means operative to examine each multiplexer input circuit signal condition during a plurality of successive sequential cycles and determine and remember whether there is event data present or event data absent, and, effective responsive to a determination of event data present for at least two successive cycles followed by a determination of event data absent for at least two successive cycles at the same input circuit, to cause the event count for that input circuit to be incremented.

3. Apparatus as set forth in claim 1 wherein said adder comprises event occurrence validation means and event incrementing means, said validation means being operative to examine each multiplexer input circuit signal condition during a plurality of successive sequential cycles and determine and remember whether there is event data present or event data absent, and, effective responsive to a determination of event data present for at least two successive cycles followed by a determination of event data absent for at least two successive cycles at the same input circuit, to cause said event incrementing means to cause the event count for that input circuit to be incremented.

4. Apparatus as set forth in claim 1 wherein said comparator comprises event count comparator means and temporary storage means which latter receives simultaneously the event count data from each of said count and storage registers corresponding to the same multiplexer input circuit while said event count data from said count and storage registers is being compared for magnitude by said event count comparator means, said temporary storage means returning to said storage register under control of said event count comparator means the event count data of larger magnitude from either said count or storage registers and blocking the event count data of lesser magnitude.

5. Apparatus as set forth in claim 1 wherein said comparator comprises comparator input and output signal control means effective responsive to a first condition of a particular control signal from said timing control means to permit passage of data into said comparator input circuits and out of said comparator output circuit, and effective responsive to a second condition of said particular control signal from said timing control means to prevent passage of data into said comparator input circuits and out of said comparator output circuit, the time duration of said first condition of said particular control signal being equal to and coextensive with the sum of the time interval required for one complete input multiplexer cycle plus one of said predetermined time intervals.

6. Apparatus as set forth in claim 1 wherein said output control circuit comprises first control means effective responsive to receipt of a first transmission control signal from the output data transmission circuit to generate control signals operative to cause said event count data in said storage register to be continuously recirculated through said register and to the said input circuit of said output means, and operative to cause an output date transmission signal at the output circuit of said output means consisting of intervals of event count data signals from said storage register in alternation with intervals of signals from a different signal source.

7. Apparatus as set forth in claim 1 wherein said comparator comprises comparator input and output signal control means effective responsive to a first condition of a particular control signal from said timing control means to permit passage of data into said comparator input circuits and out of said comparator output circuit, and effective responsive to a second condition of said particular control signal from said timing control means to prevent passage of data into said comparator input circuits and out of said comparator output circuit, and wherein said output control circuit comprises first control means effective responsive to receipt of a first transmission control signal from the output data transmission circuit to generate control signals when said particular control signal from said timing control meams is characterized by its said second condition, said generated control signals being operative as long as generated to prevent said particular control signal from assuming its said first condition.

8. Apparatus as set forth in claim 3 wherein each said predetermined time interval during each cycle when each multiplexer input circuit is operatively coupled to said adder comprises a control data interval and a count data interval, said event occurrence validation means being operative only during said control data interval and said event incrementing means being operative only during said count data interval.

9. Apparatus as set forth in claim 3 wherein said comparator comprises event count comparator means and temporary storage means which latter receives simultaneously the event count data from each of said count and storage registers corresponding to the same multiplexer input circuit while said event count data from said count and storage registers is being compared for magnitude by said event count comparator means, said temporary storage means returning to said storage register under control of said event count comparator means the event count data of larger magnitude from either said count or storage registers and blocking the event count data of lesser magnitude.

10. Apparatus as set forth in claim 3 wherein said comparator comprises comparator input and output signal control means effective responsive to a first condition of a particular control signal from said timing control means to permit passage of data into said comparator input circuits and out of said comparator output circuit, and effective responsive to a second condition of said particular control signal from said timing control means to prevent passage of data into said comparator input circuits and out of said comparator output circuit, and wherein said output control circuit comprises first control means effective responsive to receipt of a first transmission control signal from the ouput data transmission circuit to generate control signals when said particular control signal from said timing control means is characterized by its said second condition, said generated control signals being operative as long as generated to prevent said particular control signal from assuming its said first condition.

11. Apparatus as set forth in claim 4 wherein each said predetermined time interval during each cycle when each multiplexer input circuit is coupled to the multiplexer output circuit comprises a control data interval and a count data interval, and wherein said comparator during the comparison cycle further includes means effective to place in the control data interval associated with each multiplexer input circuit a pair of sequential recognition signals the first of which is operative during output data transmission to denote the end of the event count data for the previous multiplexer input circuit and the second of which is operative to denote the beginning of thee event count data for the next multiplexer input circuit.

12. Apparatus as set forth in claim 4 wherein said temporary storage means comprises a separate shift register for the event count data of each of said count and storage registers, said shift registers each introducing a data flow delay time equal to the aforesaid predetermined time interval during which each multiplexer input circuit is coupled to the multiplexer output circuit, whereby, one complete comparison cycle time consists of the sum of the time interval required for one complete input multiplexer cycle plus one of said predetermined time intervals.

13. Apparatus as set forth in claim 4 wherein said output control circuit comprises first control means effective responsive to receipt of a first transmission control signal from the output data transmission circuit to generate control signals operative to cause said event count data in said storage register to be continuously recirculated through said register and to the said input circuit of said output means, and operative to cause an output dats transmission signal at the output circuit of said output means consisting of intervals of event count data signals from said storage register in alternation with intervals of signals from a different signal source.

14. Apparatus as set forth in claim 6 wherein said output data transmission signal intervals of event count data signals and signals from a different signal source are of equal duration.

15. Apparatus as set forth in claim 6 wherein said output data transmission signal interval of event count data signals is equal to the time interval necessary to recirculate the event count data through the storage register an integral number of times.

16. Apparatus as set forth in claim 6 wherein said output data transmission signals which are signals from a different signal source are signals generated by signal generating means comprising part of said output control circuit 17. Apparatus as set forth in claim 6 wherein said generated control signals operative to cause recirculation of said event count data in said storage register comprise a first pulse train clock signal derived from said timing control means, wherein the incrementing and comparison operation of said adder and comparator are effected by a second pulse train clock signal and other timing signals derived from said timing control means, and wherein the repetition rate of said first clock signal is substantially slower than the repetition rate of said second clock signal.

18. Apparatus as set forth in claim 6 further including output control circuit additional control means operatively coupled to said first control means and effective responsive to receipt of a second transmission control signal from the output data transmission circuit to generate control signals operative to clear the event count data from the said storage and count registers and from the said adder.

19. Apparatus as set forth in claim 6 further including output control circuit second control means operatively coupled to said first control means and effective responsive to termination of the aforesaid first transmission control signal from the output data transmission circuit to cause said first control means to terminate the generation of said control signals.

20. Apparatus as set forth in claim 8 wherein said event occurrence validation means utilizes said count register as a memory to remember for each input circuit the sequence of occurrence of event data present and event data absent information.

21. Apparatus as set forth in claim 9 wherein said temporary storage means comprises a separate shift register for the event count data of each of said count and storage registers, said shift registers each introducing a data flow delay time equal to the aforesaid predetermined time interval during which each multiplexer input circuit is coupled to the multiplexer output circuit, whereby, one complete comparison cycle time consists of the sum of the time interval required for one complete input multiplexer cycle plus one of said predetermined time intervals.

22. Apparatus as set forth in claim 9 wherein each said predetermined time interval during each cycle when each multiplexer input circuit is coupled to the multiplexer output circuit comprises a control data interval and a count data interval, and wherein said comparator during the comparison cycle further includes means effective to place in the control data interval associated with each multiplexer input circuit a pair of sequential recognition signals the first of which is operative during output data transmission to denote the end of the event count data for the previous multiplexer input circuit and the second of which is operative to denote the beginning of the event count data for the next multiplexer input circuit.

23. apparatus as set forth in claim 12 wherein said output control circuit comprises first control means effective responsive to receipt of a first transmission control signal from the output data transmission circuit to generate control signals operative to cause said event count data in said storage register to be continuously recirculated through said register and to the said input circuit of said output means, and operative to cause an output data transmission signal at the output circuit of said output means consisting of intervals of event count data signals from said storage register in alternation with intervals of signals from a different signal source.

24. Apparatus as set forth in claim 12 further including comparator input and output signal control means effective responsive to a first condition of a particular control signal from said timing control means to permit passage of data into and out of said comparator, and effective responsive to a second condition of said particular control signal from said timing control means to prevent passage of data into and out of said comparator, the time duration of said first condition of said particular control signal from said timing control means being equal to and coextensive with the aforesaid complete comparison cycle time.

25. Apparatus as set forth in claim 14 wherein said output data transmission signal interval of event count data signals is equal to the time interval necessary to recirculate the event count data through the storage register an integral number of times.

26. Apparatus as set forth in claim 19 wherein said first control means automatically terminates the generation of said control signals at such time as to cause the termination of storage register recirculation with the storage register event count data in proper alignment within the register to correspond to the alignment of event count data in the count register.

27. Apparatus as set forth in claim 23 further including output control circuit additional control means operatively coupled to said first control means and effective responsive to receipt of a second transmission control signal from the output data transmission circuit to generate control signals operative to clear the event count data from the said storage and count registers and from the said adder.

28. Apparatus as set forth in claim 24 wherein said storage register is in a static shift state during the time interval that said particular control signal exhibits its said second condition, and is in a dynamic shift state during the aforesaid comparison cycle time.

29. Apparatus as set forth in claim 25 wherein said output data transmission signals which are signals from a different signal source are signals generated by signal generating means comprising part of said output control circuit.

30. Apparatus as set forth in claim 29 further including output control circuit second control means operatively coupled to said first control means and effective responsive to termination of the aforesaid first transmission control signal from the output data transmission circuit to cause said first control means to terminate the generation of said control signals.

31. Event monitoring transceiver apparatus comprising in combination a. parallel to serial electrical signal input multiplexer means having an output circuit and a plurality of independent input circuits each cyclically selectively singly sequentially operatively coupled to said output circuit for a predetermined time interval to thereby deliver to said output circuit a sequence of electrical signals corresponding to the signal condition at each of said input circuits during the time interval that the particular selected input circuit is coupled to the said output circuit, b. adder means and count register means, said adder means being operatively coupled to said count register means and to said multiplexer to receive the multiplexed output data from the latter and operative to increment the event data count in said count register for each multiplexer input circuit when the adder detects the occurrence of a valid event at the input circuit then selected, c. comparator means and storage register means, said comparator means being operatively coupled to said count register and to said storage register for receiving and comparing the event count data in each for each of said input circuits and thereafter transmitting the event count data of larger magnitude to said storage register means, d. output control circuit means and output means operatively coupled to each other and to said storage register means, said output cocntrol circuit means being adapted for coupling to and for receiving transmission control signals from an output data transmission circuit and being adapted in response to the receipt of such transmission control signals to generate and transmit output control signals to said storage register effective to shift said event count data out of said storage register means and through said output means under control of said output control circuit means, said output means having an output circuit adapted for coupling to said output transmission circuit, e. timing control means continuously generating timing control signals and operatively coupled to and sending timing control signals to all of said input multiplexer, adder, count register, comparator, storage register and output control circuit.

* * * * *